Figure 1:
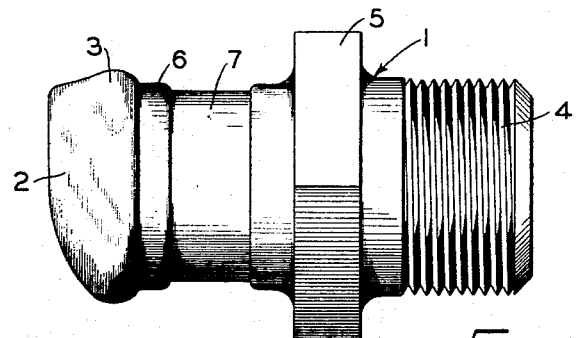

United States Patent Office

3,275,349
Patented Sept. 27, 1966

3,275,349
HOSE CONNECTION DEVICE
Dale A. Chovan, Trafford, Pa., assignor to Westinghouse Air Brake Company, Wilmerding, Pa., a corporation of Pennsylvania
Filed Dec. 12, 1963, Ser. No. 330,150
1 Claim. (Cl. 285—252)

This invention relates to hose connection devices and, more specifically, to such a device as may be used with high pressure hoses of the type employed in brake systems on railway vehicles, for example, for providing a flexible connection between sections of the brake pipe on adjacent cars of a train. As used herein, the term "connection device" is intended to refer to the hose nipple at one end of the flexible hose for connecting the hose to the angle cock at the end of the brake pipe, and to the hose coupling at the other end of the flexible hose for connection to a mating coupling member on the hose carried by the adjacent car.

Typical of the more common structure of hose nipple as presently used on hose connection devices is one having a larger diameter portion at the lip end for receiving the hose, with the annular bead-like formation surrounding the hose-receiving end, while the opposite end is usually threaded and provided with a hex-shaped portion adjacent thereto so that the nipple may be screwed into an angle cock, pipe bracket or other pipe adapter to which it is to be connected. Such a hose nipple also usually has between its two ends a straight neck or sealing portion of uniform smaller diameter relative to the hose-receiving end, on which neck or sealing portion the hose is usually clamped with a machine-applied metal band to seal the hose on the nipple. With this type of hose nipple, however, the high fluid pressure and possible pulling stresses to which the clamped hose may be subjected often times cause the seal betwen the hose and nipple to be disrupted and thereby result in leakage, which especially in railway brake systems is objectionable and even possibly dangerous.

In the hose nipples presently in use, a good seal between the hose and the nipple is not always attained because the clamping band which is usually narrower than the axial length of the neck or sealing portion of the nipple, and therefore is of lesser area, must provide sufficient sealing pressure to seal the hose against the entire surface or length of the neck portion. Moreover, since the neck portion is usually of uniform diameter and, as above noted, is axially longer than the width of the sealing band, there is a possibility that, in the event the seal between the hose and nipple is broken, the hose will slip on the neck of the nipple when subjected to pulling stresses and may become completely dislodged therefrom to disrupt flow of pressurized fluid through the train. A highly efficient seal may also be difficult to attain because the surface of the neck or sealing portion may be relatively rough since, in most instances, this portion of the nipple, which is usually cast metal, is not machined for economic reasons.

Primarily, the object of the present invention, therefore, is to provide an improved hose nipple for use with hose connection devices and characterized by means for providing an effecitve sealing relationship between the hose and the nipple, which sealing relationship will withstand all fluid pressures and stresses under which the connection is intended to function, and for preventing dislodging of the hose from the nipple when subjected to severe pulling stresses. The invention comprises an improved hose nipple having a circumferential bead surrounding the lip or hose-receiving end, a threaded portion at the opposite end for connecting the nipple to an angle cock, pipe bracket or other suitable adapter, and a neck or sealing portion between the hose-receiving end and the threaded portion and of smaller diameter relative to said hose-receiving end, said neck or sealing portion being provided with an annular shallow groove of substantially the same width as a metal clamping band by which the hose is clamped to the nipple. The shoulders of the annular groove surrounding the neck or sealing portion of the nipple are rounded so that, upon application of the metal band, which is axially positioned on the hose and nipple so as to coincide with said annular groove, the hose is forced or compressed into the annular groove to form an effective seal while at the same time the shoulders prevent the hose from being dislodged under severe stresses and yet do not have any cutting effect due to their rounded contours.

Figure 2:
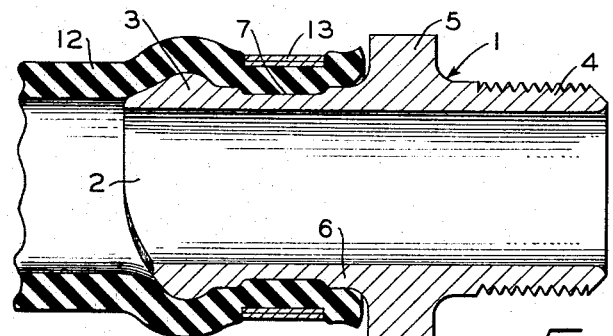
Figure 3:
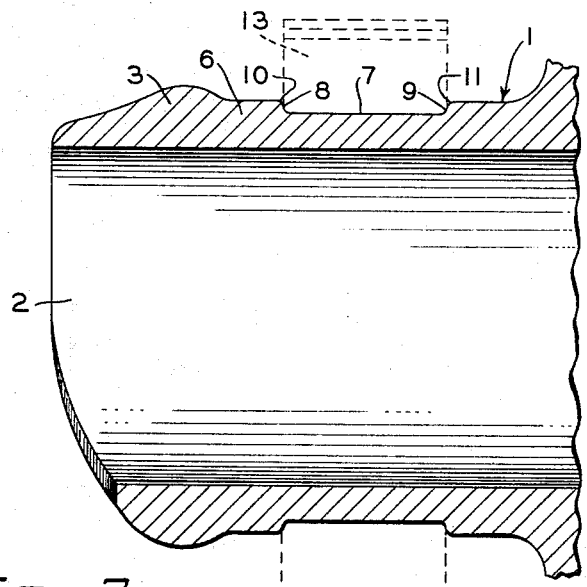

In the drawing, FIG. 1 is an outline view of an improved hose nipple; FIG. 2 is a sectional view taken on a vertical plane passing through the axis of the nipple shown in FIG. 1 and showing a portion of a hose applied thereon; and FIG. 3 is an exploded view of a portion of the improved hose nipple with the hose removed but showing the position of a clamping band relative to the nipple.

*Description and operation*

As shown in FIG. 1, an improved hose connection device or nipple 1 comprises a hose-receiving end or lip 2 surrounded by an annular bead 3, said bead being of smooth rounded contour for facilitating the application of a hose onto the nipple. The nipple is further provided at the end opposite the hose-receiving end 2 with a threaded portion 4 whereby the nipple may be connected to a pipe bracket, for example, or some other adapter (neither of which is shown) for receiving such a hose nipple. A polygonal sided and, in this case, a hex-shaped wrench-receiving portion 5 is formed integrally on the hose nipple 1 adjacent the inner end of the threaded portion 4, whereby a wrench may be applied on said hex-shaped portion for tightening the nipple into place.

A cylindrical neck or sealing portion 6 is disposed between the hose-receiving end 2 and the hex-shaped portion 5, said neck or sealing portion being of smaller diameter than the hose-receiving end. According to the invention and as more clearly shown in FIG. 3, a shallow annular groove 7 is formed in the sealing portion substantially midway between the two ends of said sealing portion and has two oppositely facing shoulders 8 and 9 at the respective axial extremities thereof, each of said shoulders having respective rounded edges 10 and 11 adjoining the surface of said sealing portion for a purpose to be hereinafter disclosed.

A high pressure hose 12 consisting of a resilient material such as cord-reinforced rubber, a portion of which is shown in FIG. 2, is forced over the lip 2, the bead 3 and the neck portion 6 of the nipple 1 until the end of the hose abuts against the hex-shaped portion 5. When in place on the nipple 1, the hose 12 may be securely and sealingly clamped thereto by a band or clamp 13 applied by a suitable hose clamping machine, such as that disclosed in U.S. Patent No. 2,729,994, issued to Ellis E. Hewitt et al. on January 10, 1956, reissued as Reissue Patent No. 24,636 on April 21, 1959, and assigned to the assignee of the present application.

The clamp 13 is substantially the same width as the width of groove 7 and is clamped into a position axially coinciding with that of said groove, so that that portion of the hose 12 surrounded by said clamp is compressed into the groove 7 to form an effective seal with the surface of said groove. As is clearly shown in FIG. 2 of the drawing, when the hose 12 is securely clamped by the clamp 13 and compressed into groove 7, there is no cutting action on said hose by the shoulders 8 and 9 due to the rounded edges 10 and 11, respectively. Moreover, with the hose 12 securely clamped in the groove 7, it is virtually impossible for the hose to be dislodged when subjected to fluid pressure or pulling stresses, and, therefore, the possibility of destroying the sealing condition between the hose and the nipple 1 and of disrupting the flow of pressurized fluid through the train is reduced to a minimum.

It should be apparent that, while the drawing shows a hose nipple and the invention is described specifically in connection therewith, the features of the invention are applicable to the hose connecting portion of a hose coupling as well and are intended for application thereto although a hose coupling, as such, is not shown in the drawing and described herein.

Having now described the invention, what I claim as new and desire to secure by Letters Patent, is:

In combination:
(a) an element having a cylindrical neck, a portion of which is of uniform diameter,
(b) a hose disposed in close frictional relation over said neck, said neck having adjacent the hose-receiving end thereof in circumferentially surrounding relation a rounded bead the periphery of which is of larger diameter than said uniform diameter, said uniform diameter portion having in the outer surface thereof in axially spaced relation to said bead an annular groove of substantial width in relation to length of the said uniform diameter portion, the bottom of said groove being of uniform diameter less than the diameter of said uniform diameter portion and the sides of the groove at the opposite extremities of the said bottom constituting oppositely facing shoulders joining the uniform diameter portion and the bottom of the groove, said shoulders being characterized by curved annular surfaces at the juncture with the uniform diameter portion, and
(c) an annular band of substantially the same width as that of said annular groove to clamp the hose to said neck portion, said band being axially positioned on said neck portion so as to coincide positionally with said annular groove and, when tightened in a clamping state, to compress the hose into said annular groove to form an air-tight seal with the connection device resisting axial separation of the hose from the device.

References Cited by the Examiner

UNITED STATES PATENTS

| | | | |
|---|---|---|---|
| 514,321 | 2/1894 | Hentze | 285—253 X |
| 784,372 | 3/1905 | Albee | 285—259 X |
| 930,933 | 8/1909 | Brodie | 285—253 X |
| 1,303,098 | 5/1919 | Merz | 285—252 |
| 1,815,267 | 7/1931 | Mackall | 285—242 X |
| 1,853,473 | 4/1932 | Terwilliger | 285—253 |
| 1,866,644 | 7/1932 | Greer | 285—238 |
| 2,089,940 | 8/1937 | Brown | 285—253 X |
| 2,661,962 | 12/1953 | Nelson | 285—257 |

CARL W. TOMLIN, *Primary Examiner.*